United States Patent
Isami

(10) Patent No.: US 11,554,677 B2
(45) Date of Patent: Jan. 17, 2023

(54) ELECTRIC VEHICLE

(71) Applicant: TOYOTA JIDOSHA KABUSHIKI KAISHA, Toyota (JP)

(72) Inventor: Yoichiro Isami, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 17/113,608

(22) Filed: Dec. 7, 2020

(65) Prior Publication Data

US 2021/0229550 A1 Jul. 29, 2021

(30) Foreign Application Priority Data

Jan. 23, 2020 (JP) .............................. JP2020-008926

(51) Int. Cl.
*B60L 15/20* (2006.01)
*B60K 26/02* (2006.01)

(52) U.S. Cl.
CPC .......... *B60L 15/2054* (2013.01); *B60K 26/02* (2013.01); *B60K 2026/025* (2013.01); *B60L 2240/423* (2013.01)

(58) Field of Classification Search
CPC .............. B60K 26/02; B60K 2026/025; B60L 15/2054
USPC ......................................................... 180/315
See application file for complete search history.

(56) References Cited

U.S. PATENT DOCUMENTS

2018/0281619 A1  10/2018  Suzuki et al.

FOREIGN PATENT DOCUMENTS

| CN | 107054155 | A | * | 8/2017 | |
|---|---|---|---|---|---|
| CN | 206884797 | U | * | 1/2018 | |
| CN | 109050350 | A | * | 12/2018 | .............. B60L 15/20 |
| CN | 109177742 | A | * | 1/2019 | .............. B60L 15/20 |
| CN | 109606132 | A | * | 4/2019 | .............. B60L 15/20 |
| CN | 209409831 | U | * | 9/2019 | .............. B60L 15/20 |
| CN | 110696630 | A | * | 1/2020 | |
| EP | 3 401 201 | A1 | | 11/2018 | |
| JP | 2009-077585 | A | | 4/2009 | |
| JP | 2010-252526 | A | | 11/2010 | |
| JP | 2011-215436 | A | | 10/2011 | |
| JP | 2018-166386 | A | | 10/2018 | |
| JP | 2018-191366 | A | | 11/2018 | |
| WO | 2019/187518 | A1 | | 10/2019 | |

* cited by examiner

*Primary Examiner* — Mahmoud Gimie

(74) *Attorney, Agent, or Firm* — Oliff PLC

(57) ABSTRACT

An electric vehicle includes an electric motor for transmitting torque to a wheel, a clutch pedal operated by driver, and a torque controller for controlling torque of the electric motor. The torque controller is configured to control torque of the electric motor in response to an operation amount of the clutch pedal. The electric vehicle may include a shift lever for selecting a mode of any one of a plurality of modes in which torque characteristics of the electric motor differ in stages with respect to a rotational speed of the electric motor. The clutch pedal is operated when the shift lever is operated. The torque controller is configured to control torque of the electric motor in response to the mode selected by the shift lever.

8 Claims, 6 Drawing Sheets

ELECTRIC VEHICLE

CROSS-REFERENCE TO RELATED APPLICATION

The present application claims priority under 35 U.S.C. § 119 to Japanese Patent Application No. 2020-008926, filed Jan. 23, 2020. The contents of this application are incorporated herein by reference in their entirety.

BACKGROUND

Field

The present disclosure relates to an electric vehicle having an electric motor for transmitting torque to wheels.

Background

JP 2018-166386 discloses a technique for producing a pseudo shift change in a vehicle driven by a drive motor. In this vehicle, torque variation control is performed to decrease torque of the drive motor by a set variation amount and then increase it in response to a predetermined trigger defined by a vehicle speed, accelerator opening degree, accelerator opening speed, or brake depression amount. As a result, feeling of strangeness given to a driver who is accustomed to a driving a vehicle including a multi-stage transmission is suppressed.

SUMMARY

In a manual transmission vehicle (hereinafter referred to as "MT vehicle") equipped with a shift device (shift lever) and a clutch device (clutch pedal) for shifting gears, a driver changes gears by operating a shift lever when stepping on the clutch device. Such manual gear change operation causes instantaneous fluctuations in the torque transmitted to wheels when the clutch device is released and connected. According to the above technique, the torque variation of the manual gear change operation is pseudo reproduced by the torque variation control of the drive motor.

However, in the above technique, the driver cannot determine the timing of the torque variation control simulating the manual gear change operation voluntarily by the driver's own operation. This is because the vehicle of the above technique do not have a clutch device and a shift device provided in MT vehicles. Thus, the pseudo gear change operation which does not intervene the manual gear change operation by driver itself, there is a risk of giving a discomfort to the driving feeling of driver seeking pleasure to operate MT vehicles.

The present disclosure has been made in view of the above-described problems, and an object thereof is to provide an electric vehicle capable of pseudo-reproducing a manual gear change operation of a manual transmission vehicle.

To solve the above problems, a first disclosure is applied to an electric vehicle includes an electric motor for transmitting torque to a wheel, a clutch device operated by driver, and a torque controller for controlling torque of the electric motor. The torque controller is configured to control torque of the electric motor in response to an operation amount of the clutch device. The clutch device may include a clutch pedal or a clutch lever.

A second disclosure has the following further features in the first disclosure.

The electric vehicle further includes a shift device for selecting a mode of any one of a plurality of modes in which torque characteristics of the electric motor differ in stages with respect to a rotational speed of the electric motor. The clutch device is operated when the shift device is operated. The torque controller is configured to control torque of the electric motor in response to the mode selected by the shift device. The shift device may include a shift lever or a shift pedal.

A third disclosure further has the following features in the second disclosure.

The torque controller is configured to change torque of the electric motor toward zero as the operation amount of the clutch device increases.

A fourth disclosure has the following features in the second or third disclosure.

The torque controller is configured to change torque of the electric motor toward a value corresponding to the mode selected as the operation amount of the clutch device decreases.

A fifth disclosure has the following features in any one of the second to fourth disclosures.

The torque controller is configured to allow selection of a mode by the shift device when the operation amount of the clutch device is larger than a predetermined operation amount.

A sixth disclosure has the following features in any one of the second to fifth disclosures.

The torque controller has a plurality of preset patterns in which torque characteristics of the plurality of modes are defined. The torque controller is configured to control torque of the electric motor according to a preset pattern selected from among the plurality of preset patterns.

A seventh disclosure has the following features in any one of the second to sixth disclosures.

The torque controller is configured to acquire a virtual engine speed that simulates an engine speed assuming that a traveling condition of the electric vehicle is realized by a driving force of an engine based on a driving state of the electric vehicle. The torque controller is configured to add an engine sound based on the virtual engine speed.

A eighth disclosure has the following features in any one of the second to seventh disclosures.

The electric vehicle further includes an input device for arbitrarily setting torque characteristics of the plurality of modes.

A ninth disclosure is applied to an electric vehicle that includes an electric motor for transmitting torque to a wheel and does not include an engine and a transmission and a clutch mechanism connected to the engine. The electric vehicle includes a shift device operated by driver and configured to simulate an operation of the transmission, a clutch device operated by the driver when the shift device is operated and configured to simulate an operation of the clutch mechanism, and a torque controller configured to control torque of the electric motor. The shift device is configured to select a mode of any one of a plurality of modes in which torque characteristics of the electric motor differ in stages with respect to a rotational speed of the electric motor and output a signal including the selected mode to the torque controller. The clutch device is configured to output a signal including an operation amount of the clutch device to the torque controller. The torque controller is configured to control torque of the electric motor based on the signal including an operation amount of the clutch device and the signal including the mode selected by the shift device. The clutch device may include a clutch pedal or a clutch lever. The shift device may include a shift lever or a shift pedal.

A tenth disclosure is applied to an electric vehicle including an electric motor for transmitting torque to a wheel, a clutch lever operated by driver, and a torque controller for controlling torque of the electric motor. The torque controller is configured to control torque of the electric motor in response to an operation amount of the clutch lever.

According to the first disclosure, the electric vehicle includes the clutch device. The torque controller controls torque of the electric motor in response to the operation amount of the clutch device. Thus, since the torque of the electric motor is controlled in response to the operation of the clutch device of the driver, it is possible to simulate the manual gear change operation of the MT vehicle. As a result, people who own MT vehicles with internal combustion engines can be provided a chance to switch to electric vehicles for manual gear change operation, thus reducing $CO_2$ emissions from the spread of electric vehicle.

According to the second disclosure, the shift device can select any one of a plurality of modes in which the torque characteristics with respect to the rotational speed of the electric motor are stepwise different. Thus, since the torque of the electric motor is controlled in response to the driver's operation of the shift device, it is possible to simulate the manual gear change operation of the MT vehicle.

According to the third disclosure, as the amount of operation of the clutch device increases, the torque of the electric motor can be approached to zero. As a result, it is possible to reproduce the sensation of torque being released toward zero by the operation of increasing the operation amount of the clutch device. This allows the driver to have a strong sense of driving with the manual gear change operation.

According to the fourth disclosure, as the operation amount of the clutch device decreases, the torque of the electric motor can be made close to a value corresponding to the selected mode. Thus, it is possible to reproduce the feeling that the torque is transmitted to the wheels by the operation of reducing the operation amount of the clutch device. This allows the driver to have a strong sense of driving with the manual gear change operation.

According to the fifth disclosure, the selection of the mode by the shift device is allowed when the operation amount of the clutch device is greater than the predetermined operation amount. Thus, it is possible to faithfully reproduce the manual gear change operation of the MT vehicle operating the shift device by operating the clutch device.

According to the sixth disclosure, it is possible to change the pattern of torque characteristics associated with the mode. Thus, it is possible to realize a torque characteristic according to the driver's mood.

According to a seventh disclosure, the engine sound is added in response to the virtual engine speed simulating the engine speed. This allows the driver to get the feeling of operation an engine vehicle.

According to the eighth disclosure, the driver can arbitrarily set the torque characteristics of the plurality of modes to suit the preference using an input device.

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

Embodiment

1. Configuration of Electric Vehicle of Embodiment

Figure 1:
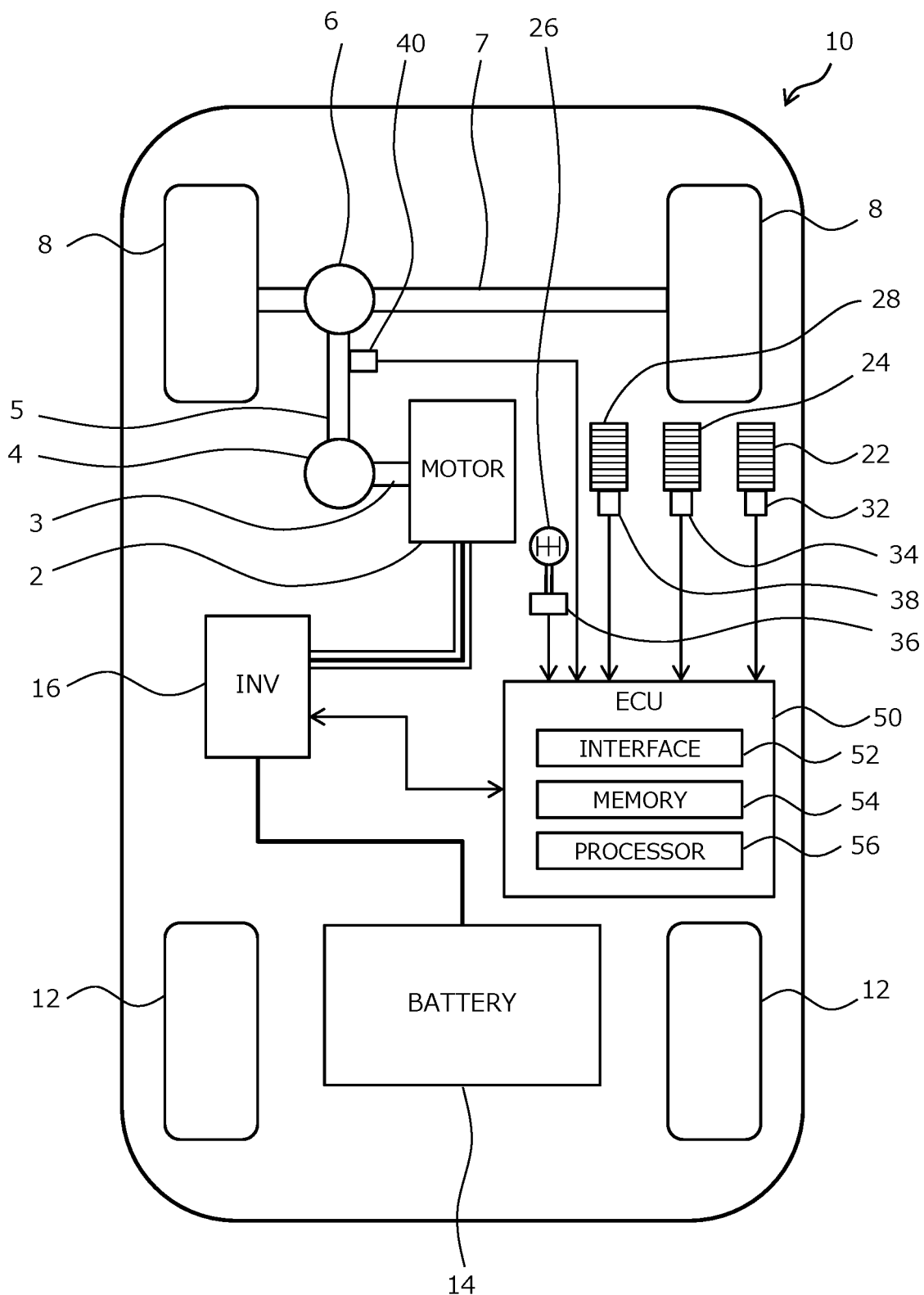
FIG. 1 is a diagram schematically showing a configuration of an electric vehicle according to a present embodiment.

FIG. 1 is a diagram schematically showing a configuration of an electric vehicle according to the present embodiment. As shown in FIG. 1, an electric vehicle 10 is provided with an electric motor 2 as a driving source. The electric motor 2 is, for example, a three-phase AC motor. An output shaft 3 of the electric motor 2 is connected to one end of a propeller shaft 5 via a gear mechanism 4. The other end of the propeller shaft 5 is connected to a drive shaft 7 in front of the vehicle via a differential gear 6. The electric vehicle 10 is provided with drive wheels 8 as front wheels and driven wheels 12 as rear wheels. The drive wheels 8 are provided on each end of the drive shaft 7. A rotation speed sensor 40 for detecting a shaft rotation speed Np is disposed on the propeller shaft 5.

The electric vehicle 10 includes a battery 14 and an inverter 16. The battery 14 stores electrical energy for use in driving the electric motor 2. The inverter 16 converts a direct current stored in the battery 14 to a three-phase alternating current, for example, by performing a pulse width modulation process (PWM). Further, the inverter 16 has a function of controlling driving torque of the electric motor 2 based on a target driving torque input from an ECU 50 to be described later.

The electric vehicle 10 includes an accelerator pedal 22 for inputting an acceleration request and a brake pedal 24 for inputting a braking request as an operation request input device for inputting an operation request to the electric vehicle 10 by driver. The accelerator pedal 22 is provided with an accelerator position sensor 32 for detecting the accelerator opening Pap (%). Further, the brake pedal 24 is provided with a brake position sensor 34 for detecting the pedal depression amount. Each of signals detected by the accelerator position sensor 32 and the brake position sensor 34 is output to the ECU 50 to be described later.

The electric vehicle 10 further includes a shift lever 26 and a clutch pedal 28 as the operation request input device. However, since the electric vehicle 10 of the present embodiment is a vehicle driven by the electric motor 2 and does not include an engine, it does not include a transmission and a clutch mechanism provided by an MT vehicle. Therefore, the shift lever 26 and the clutch pedal 28 are given the following functions as a pseudo-shift lever and a pseudo-clutch pedal in place of the actual functions of mechanically operating the actual transmission and the clutch mechanism.

The shift lever 26 is provided with a function as a shift device for driver to select one mode from among a plurality of modes in which torque characteristics of the electric motor 2 are defined in stages with respect to a rotational speed of the electric motor 2. The plurality of modes are shift modes simulating the gear stages of an MT vehicle, including, for example, 1st gear, 2nd gear, 3rd gear, 4th gear, 5th gear, 6th gear and N (neutral) modes. The torque characteristics of each mode are preset to the torque characteristics simulating the gear stage of an MT vehicle. However, since each of these modes simply simulate the gear stage of an MT vehicle, there is no restriction of the torque characteristics of each mode to correspond to an actual fixed gear ratio. That is, the torque characteristics of each of the plurality of modes can be freely preset within an output range of the electric motor 2.

The shift lever 26 has a structure simulating a shift lever provided by an MT vehicle. The layout and feeling of operation of the shift lever 26 is equivalent to an actual MT vehicle. The shift lever 26 is provided with each position corresponding to the plurality of modes having different torque characteristics. The shift lever 26 is provided with a shift position sensor 36 for detecting a shift position Gp representing a position of the mode. The signals detected by the shift position sensor 36 are output to the ECU 50 which will be described later.

The clutch pedal 28 is provided with a function as a clutch device having a structure simulating a clutch pedal provided by an MT vehicle. The clutch pedal 28 is depressed when the driver operates the shift lever 26. The layout and feeling of operation of the clutch pedal 28 is equivalent to an actual MT vehicle. The clutch pedal 28 is provided with a clutch position sensor 38 for detecting a clutch pedal depressing amount Pc (%) which is an operation amount of the clutch pedal 28. The signal detected by the clutch position sensor 38 is output to the ECU 50 which will be described later.

The electric motor 2 of the electric vehicle 10 is controlled by a controller 50. The controller 50 is the ECU (Electronic Control Unit). A processing circuitry of the ECU 50 includes at least an input/output interfaces 52, at least one memory 54, and at least one CPU (processor) 56. The input/output interface 52 is provided to receive sensor signals from various sensors mounted on the electric vehicle 10 and to output operation signals to various actuators provided in the electric vehicle 10. The various sensors for which the ECU 50 receives signals include the sensors as described above, as well as various sensors required for the control of the electric vehicle 10. The actuators in which the ECU 50 output the operation signals include the various actuators such as the electric motor 2 described above. The memory 54 stores various control programs for controlling the electric vehicle 10, the latest shift position Gp, maps, and the like. The CPU (processor) 56 reads out and executes the control program or the like from the memory 54, and generates operation signals based on the received sensor signals.

The functions of the ECU 50 are realized by software, firmware, or a combination of software and firmware. Also, if the processing circuitry of the ECU 50 includes at least one dedicated hardware, the processing circuitry may be, for example, a single circuit, a complex circuit, a programmed processor, a parallel programmed processor, ASIC, FPGA, or combinations thereof. The functions of each part of the ECU 50 may be realized in the respective processing circuitry. Further, the functions of each part of the ECU 50 may be realized by the processed circuitry together. In addition, for each function of the ECU 50, some of the functions of the ECU 50 may be realized with dedicated hardware, and others may be realized with software or firmware. As described above, the processing circuitry realizes each functions of the ECU 50 by using hardware, software, firmware, or combinations of these functions.

2. Functions of ECU

The control of the electric vehicle 10 performed by the ECU 50 includes torque control for controlling torque transmitted to the drive wheels 8. In the torque control, the driving torque of the electric motor 2 is controlled so that an electric motor driving torque Tp transmitted to the propeller shaft 5 becomes a required electric motor driving torque Tpreq. That is, the ECU 50 functions as a torque controller provided by the electric vehicle 10.

Here, in the torque control of the electric motor 2, the ECU 50 performs a calculation assuming that a traveling condition of the electric vehicle 10 is realized by the MT vehicle equipped with a virtual engine and a virtual transmission. Then, the ECU 50 calculates a transmission output torque Tgout output from the transmission, and uses the calculated transmission output torque Tgout as the required electric motor driving torque Tpreq. In the following description, an engine mounted virtually on the electric vehicle 10 is denoted as a "virtual engine", an engine output torque of the virtual engine is denoted as a "virtual engine output torque Teout", and an engine speed of the virtual engine is denoted as a "virtual engine speed Ne".

Figure 2:
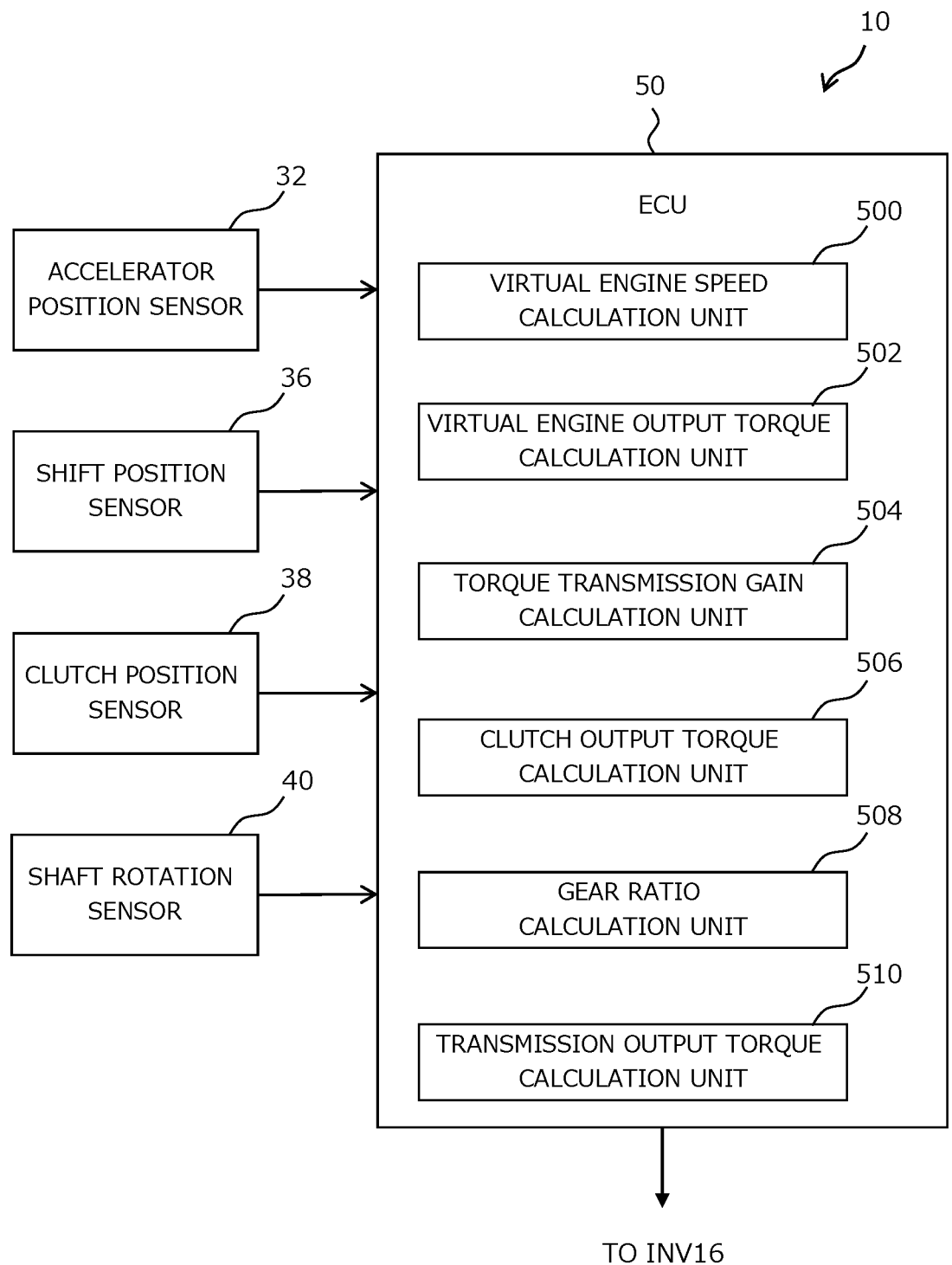
FIG. 2 is a diagram illustrating a functional block of an ECU relating to torque control of an electric motor.

FIG. 2 is a diagram illustrating a functional block of the ECU 50 relating to torque control of the electric motor. The ECU 50 includes a virtual engine speed calculation unit 500, a virtual engine output torque calculation unit 502, a torque transmission gain calculation unit 504, a clutch output torque calculation unit 506, a gear ratio calculation unit 508, and a transmission output torque calculation unit 510 as functional blocks related to the torque control of the electric motor 2. Each functional block will be described in detail below.

2-1. Virtual Engine Speed Calculation Unit 500

While the electric vehicle 10 is traveling, the ECU 50 dynamically calculates the virtual engine speed Ne based on a driving condition. For example, the ECU 50 performs inverse calculation of the virtual engine speed Ne during traveling from the following equation (1) using a shaft rotational speed "Np" of the propeller shaft 5, a gear ratio "r"

corresponding to the shift position Gp, and a slip ratio "slip" of the clutch mechanism calculated from the clutch pedal depression amount Pc or the like.

$$Ne = Np \times (1/r) \times slip \quad (1)$$

It can be assumed that kinetic energy that is not used for torque transmission to the propeller shaft 5 out of the energy output from an engine is used to increase the virtual engine speed Ne. Therefore, the calculation of the virtual engine speed Ne may be a method of dynamically calculating based on the equation of motion based on the kinetic energy.

Further, during idling of the MT vehicle, idle speed control (ISC control) is performed to maintain the engine speed at a constant engine speed. Therefore, in view of the ISC control in the virtual engine, when, for example, the shaft rotation speed Np is 0 (zero) and the accelerator opening Pap is 0%, the ECU 50 outputs the virtual engine speed Ne as a predetermined idling speed (for example, 1000 rpm) on the assumption that the virtual engine is idling. The calculated virtual engine speed Ne is output to the virtual engine output torque calculation unit 502.

2-2. Virtual Engine Output Torque Calculation Unit 502

Figure 3:
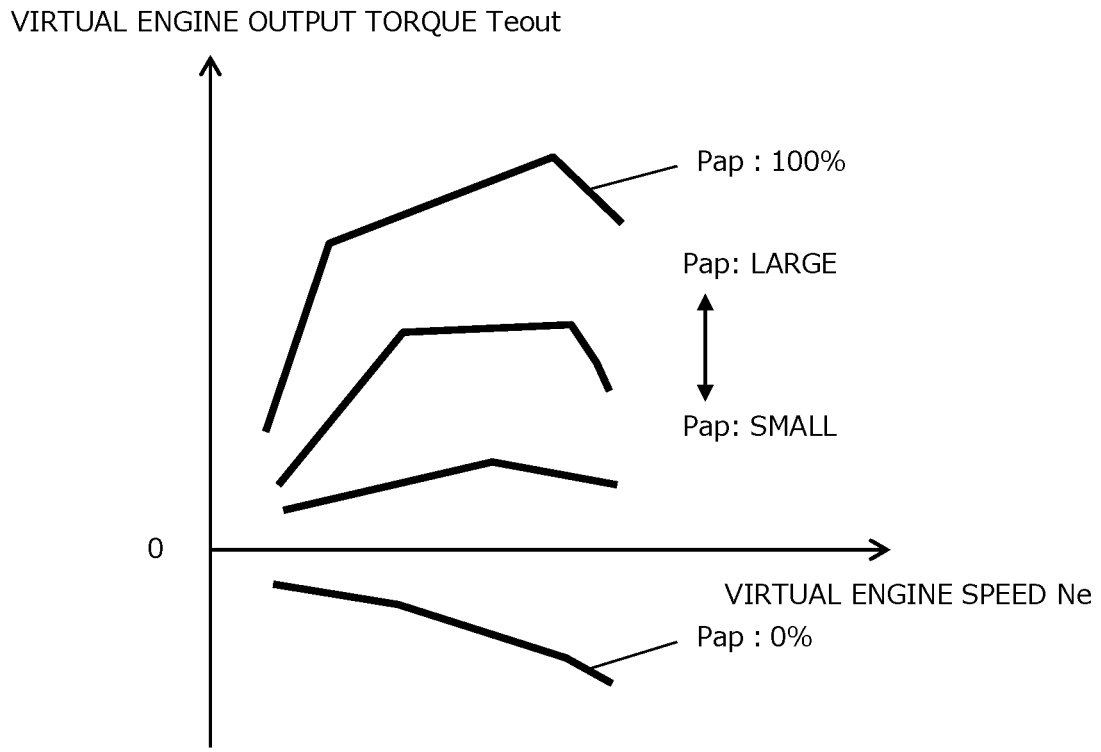
FIG. 3 is a diagram showing a calculation map of a virtual engine output torque.

The virtual engine output torque calculation unit 502 is a functional block that executes a process of calculating the virtual engine output torque Teout. The accelerator opening degree Pap and the virtual engine speed Ne are input to the virtual engine output torque calculation unit 502. The memory 54 of the ECU 50 stores a map in which the virtual engine output torque Teout for the virtual engine speed Ne is specified for each accelerator opening Pap. FIG. 3 is a diagram showing a calculation map of the virtual engine output torque. In the virtual engine output torque calculation unit 502, the virtual engine output torque Teout corresponding to the input accelerator opening Pap and the virtual engine speed Ne is calculated using the map shown in FIG. 3. The calculated virtual engine output torque Teout is output to the clutch output torque calculation unit 506.

2-3. Torque Transmission Gain Calculation Unit 504

Figure 4:
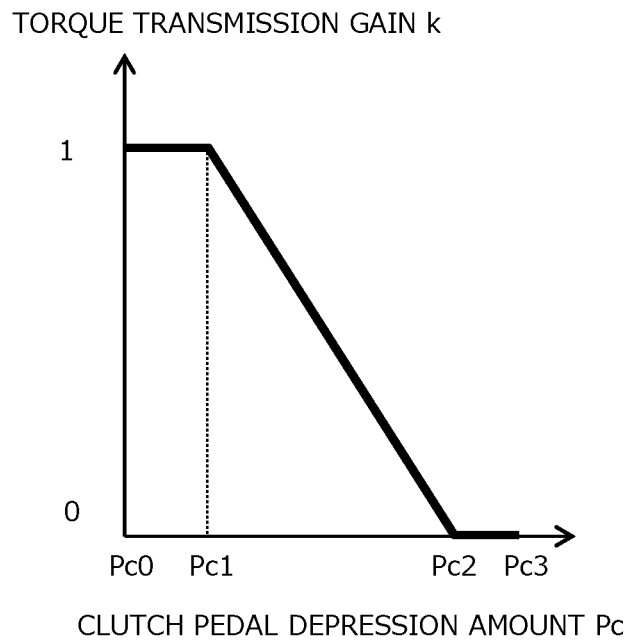
FIG. 4 is a diagram showing a calculation map of a torque transmission gain.

The torque transmission gain calculation unit 504 is a functional block that executes a process of calculating a torque transmission gain k. The torque transmission gain k is a gain for calculating a torque transmission degree corresponding to a clutch pedal depression amount of the virtual engine. The clutch pedal depressing amount Pc is input to the torque transmission gain calculation unit 504. The memory 54 of the ECU 50 stores a map in which the torque transmission gain k for the clutch pedal depression amount Pc is specified. FIG. 4 is a diagram showing a calculation map of the torque transmission gain. As shown in FIG. 4, the torque transmission gain k is specified so that the clutch pedal depression amount Pc becomes 1 in the range from pc0 to pc1, and gradually decreases toward 0 as the clutch pedal depression amount Pc increases in the range from Pc1 to Pc2 and the clutch pedal depression amount Pc becomes 0 in the range from Pc2 to Pc3. Here, Pc0 corresponds to a position where the clutch pedal depression amount Pc is 0%, Pc1 corresponds to a position of a play limit when depressing from Pc0, Pc3 corresponds to a position where the clutch pedal depression amount Pc is 100%, and Pc2 corresponds to a position of a play limit when returning from Pc3. In the torque transmission gain calculating unit 504, the torque transmission gain k corresponding to the input clutch pedal depression amount Pc is calculated using the map shown in FIG. 4. The calculated torque transmission gain k is output to the clutch output torque calculation unit 506.

The change in the torque transmission gain k with respect to the clutch pedal depression amount Pc shown in FIG. 4 is not limited to the change curve as long as it is a monotonic decrease toward 0 in the broad sense (monotonically non-increasing). For example, a change in torque transmission gain k ranging from Pc1 to Pc2 is not limited to a linear monotonic decrease, but may be a monotonically decreasing curve that is convex upward, or may be a monotonically decreasing curve that is convex downward.

2-4. Clutch Output Torque Calculation Unit 506

The clutch output torque calculation unit 506 is a functional block that executes a process of calculating the clutch output torque Tcout. The clutch output torque Tcout is a torque output from the clutch mechanism connected to the virtual engine. The virtual engine output torque Teout and the torque transmission gain k are input to the torque transmission gain calculation unit 504. In the clutch output torque calculation unit 506, the clutch output torque Tcout is calculated using the following equation (2) in which the virtual engine output torque Teout is multiplied by the torque transmission gain k. The calculated clutch output torque Tcout is output to the transmission output torque calculation unit 510.

$$Tcout = Teout \times k \quad (2)$$

The actual clutch mechanism often includes a damping device such as a spring or a damper. Therefore, the clutch output torque Tcout may calculate the dynamic transmission torque in consideration of the respective properties.

2-5. Gear Ratio Calculation Unit 508

Figure 5:
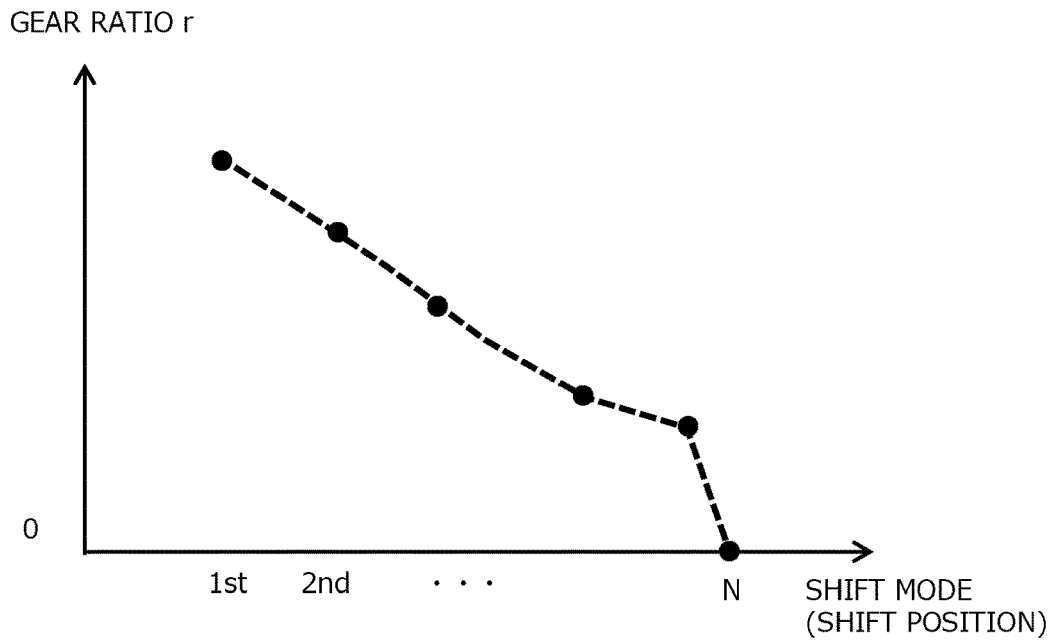
FIG. 5 is a diagram showing a calculation map of a gear ratio.

The gear ratio calculation unit 508 is a functional block that executes a process of calculating the gear ratio r. The gear ratio r is a torque characteristic of the electric motor 2 corresponding to a plurality of modes, which simulates the gear ratio of the transmission. The shift position Gp is input to the gear ratio calculation unit 508. The memory 54 of the ECU 50 stores a map in which the gear ratio r with respect to the shift position Gp is specified. FIG. 5 is a diagram showing a calculation map of the gear ratio. As shown in FIG. 5, the gear ratio r is specified so that the higher the shift position Gp is, the lower the gear ratio r is. In the gear ratio calculation unit 508, the gear ratio corresponding to the input shift position Gp is calculated using the map shown in FIG. 5. The calculated gear ratio r is output to the transmission output torque calculation unit 510.

2-6. Transmission Output Torque Calculation Unit 510

The transmission output torque calculation unit 510 is a functional block that executes a process of calculating the transmission output torque Tgout. The transmission output torque Tgout is a torque output from the transmission. The clutch output torque Tcout and the gear ratio r are input to the transmission output torque calculation unit 510. In the transmission output torque calculation unit 510, the transmission output torque Tgout is calculated using the following equation (3) in which the clutch output torque Tcout is multiplied by the gear ratio r.

$$Tgout = Tcout \times r \qquad (3)$$

2-7. Torque Control of Electric Motor

In the torque control, the ECU 50 sequentially executes processing in the virtual engine output torque calculation unit 502, the torque transmission gain calculation unit 504, the clutch output torque calculation unit 506, the gear ratio calculation unit 508, and the transmission output torque calculation unit 510. The calculated transmission output torque Tgout is output to the inverter 16 as the required electric motor driving torque Tpreq. The inverter 16 controls the command value to the electric motor 2 so that the electric motor driving torque Tp approaches the required electric motor driving torque Tpreq. In the torque control, by such a process is repeatedly executed at a predetermined control cycle, the electric motor driving torque Tp is controlled to the required electric motor driving torque Tpreq.

3. Specific Operation Flow of Manual Gear Change Operation

Figure 6:
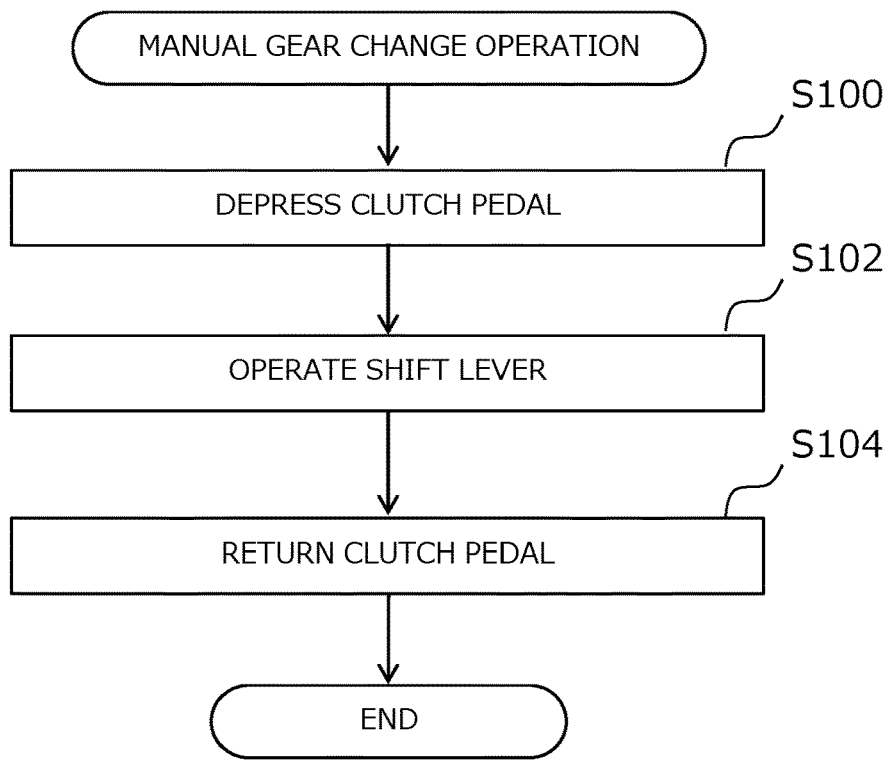
FIG. 6 is an operation flow chart showing a procedure of a pseudo manual gear change operation performed by a driver.

The driver of the electric vehicle 10 performs a manual gear change operation at any timing during operation. FIG. 6 is an operation flow chart showing a procedure of a pseudo manual gear change operation performed by the driver. As shown in FIG. 6, when the driver performs a pseudo manual gear change operation in the electric vehicle 10 of the present embodiment, first, the driver depresses the clutch pedal 28 (step S100). When the clutch pedal depressing amount Pc exceeds Pc1, the clutch output torque Tcout changes toward 0 as the clutch pedal depressing amount Pc increases. When the clutch pedal depressing amount Pc exceeds Pc2, the clutch output torque Tcout becomes 0. According to the depressing operation of the clutch pedal 28, the electric motor driving torque Tp changes toward 0 in response to the depressing operation of the clutch pedal 28. As a result, the driver can actually feel the sensation of the torque being released when the clutch pedal of the MT vehicle is depressed.

Next, the driver operates the shift lever 26 with the clutch pedal 28 depressed (step S102). Here, for example, the mode of the shift lever 26 is operated from 1st gear to 2nd gear. According to the operation of the shift lever 26 with the depression of the clutch pedal 28, the driver can obtain a feeling similar to the manual gear change operation of the MT vehicle.

Next, the driver returns the clutch pedal 28 (step S104). When the clutch pedal depressing amount Pc becomes less than Pc3, the clutch output torque Tcout changes toward the virtual engine output torque Teout as the clutch pedal depressing amount Pc decreases. Then, when the clutch pedal depressing amount Pc becomes less than Pc1, the clutch output torque Tcout becomes the virtual engine output torque Teout. According to the return operation of the clutch pedal 28, the electric motor driving torque Tp corresponding to the return operation of the clutch pedal 28 changes toward the electric motor driving torque Tp in which the current mode is reflected. As a result, the driver can actually feel the sensation that the torque is connected when the clutch pedal of the MT vehicle is returned.

According to the electric vehicle 10 of the present embodiment, the torque changes in response to the operation of the clutch pedal 28. This allow the driver to simulate the unique behavior of the MT vehicle due to manual gear change operation.

4. Modification of Electric Vehicle of Present Embodiment

The electric vehicle 10 of the present embodiment may adopt modified examples as follows. Although several modified examples will be described below, these modified examples may be combined in the structure as appropriate.

4-1. First Modification Example

The electric vehicle 10 may be configured to be switchable between an MT travel mode that performs traveling with a pseudo manual gear change operation and an EV travel mode that performs general EV traveling without a pseudo manual gear change operation. In this case, the electric vehicle 10 may be provided with a configuration for switching the MT travel mode and the EV travel mode by a switch or the like.

Further, when the electric vehicle 10 is provided with an automated driving function for performing autonomous driving to a destination, in addition to the MT travel mode and the EV travel mode, an autonomous travel mode for further performing autonomous driving may be provided. According to such a configuration for switching the travel mode, it is possible to switch the travel mode according to the purpose of use, and therefore, for example, when the electric vehicle 10 is used by three persons, i.e., father, mother, and child, it is possible to cope with various usage modes, such as selecting the MT travel mode when the father is driving, selecting the EV travel mode when the mother is driving, and selecting the autonomous travel mode when the child is driving.

4-2. Second Modification Example

According to an MT vehicle, the gear stage cannot be changed unless the clutch pedal is depressed. Therefore, in the electric vehicle 10 of the present embodiment, in order to approach the actual operation feeling of the MT vehicle, the selection operation of the mode by the operation of the shift lever 26 may be configured to permit only when the driver depresses the clutch pedal 28. Such a configuration may be configured so that, the ECU 50 permits only the shift position Gp input when the clutch pedal depression amount Pc is larger than a prescribed depression amount Pcth to be written to the memory 54 as the latest shift position.

In the MT vehicle, it is normal to be able to change gear to the neutral position without depressing the clutch pedal. Therefore, in the electric vehicle 10 of the present embodiment, similarly to the actual MT vehicle, the change of the mode to the neutral position may be configured to permit not limited to the depression of the clutch pedal 28. This make it possible to get even closer to the feel of the manual gear change operation of the MT vehicle.

4-3. Third Modification Example

In the electric vehicle 10, the torque characteristics can be freely set within the output range of the electric motor 2. Therefore, the electric vehicle 10 of the present embodiment may have a plurality of preset patterns of torque characteristics corresponding to a plurality of modes, and may be applied to allow the driver to select a preferred preset pattern from among these preset patterns.

Figure 7:
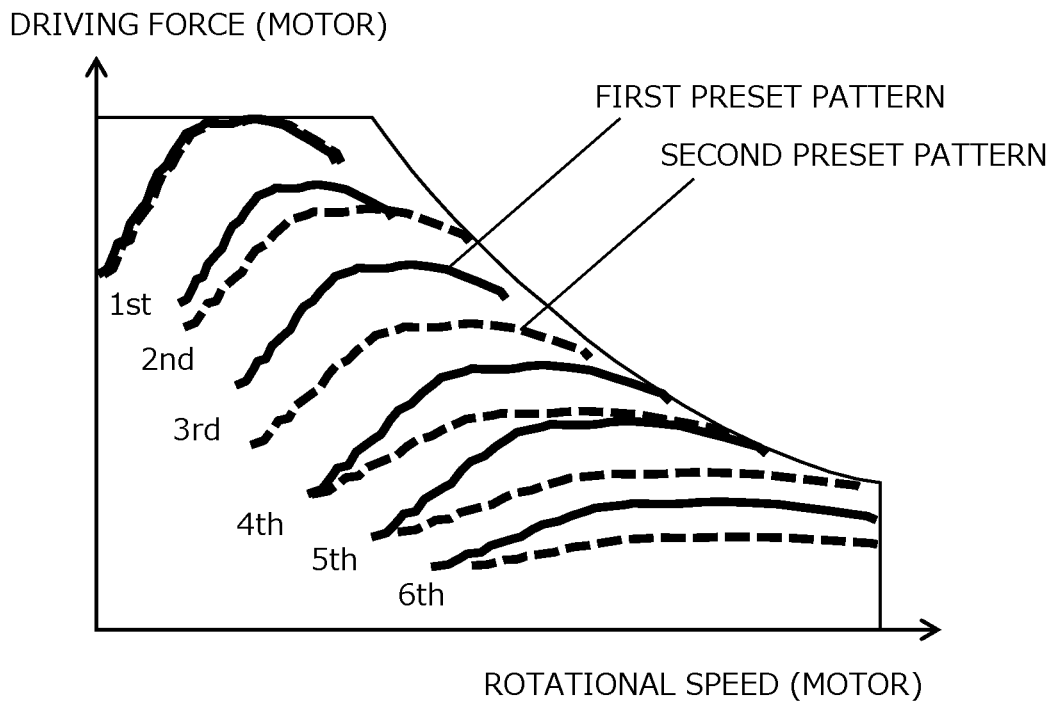
FIG. 7 is a diagram illustrating a torque characteristic of the electric motor corresponding to a plurality of modes.

FIG. 7 is a diagram illustrating a torque characteristic of the electric motor corresponding to a plurality of modes. In this figure, a first preset pattern of the torque characteristic and a second preset pattern of the torque characteristic set to the cross ratio more than the first preset pattern are exemplified. The memory 54 of the ECU 50 respectively store a calculation map of the gear ratio corresponding to the first preset pattern and a calculation map of the gear ratio corresponding to the second preset pattern. The driver operates a mode selector switch in the vehicle to select the desired pattern. The pattern selection result is output to the ECU 50. Note that there is no limitation on the number of preset patterns and the pattern contents of the torque characteristics.

In addition to the shift position Gp, a pattern selection result is input to the gear ratio calculation unit 508. In the gear ratio calculation unit 508, the gear ratio corresponding to the input shift position Gp is calculated using the calculation map of the gear ratio corresponding to the pattern selection result. According to such a configuration, the driver can select the pattern of torque characteristics by the mood of the day. As a result, it is possible to realize a driving sensation that matches the mood of the driver.

4-4. Fourth Modification Example

Figure 8:
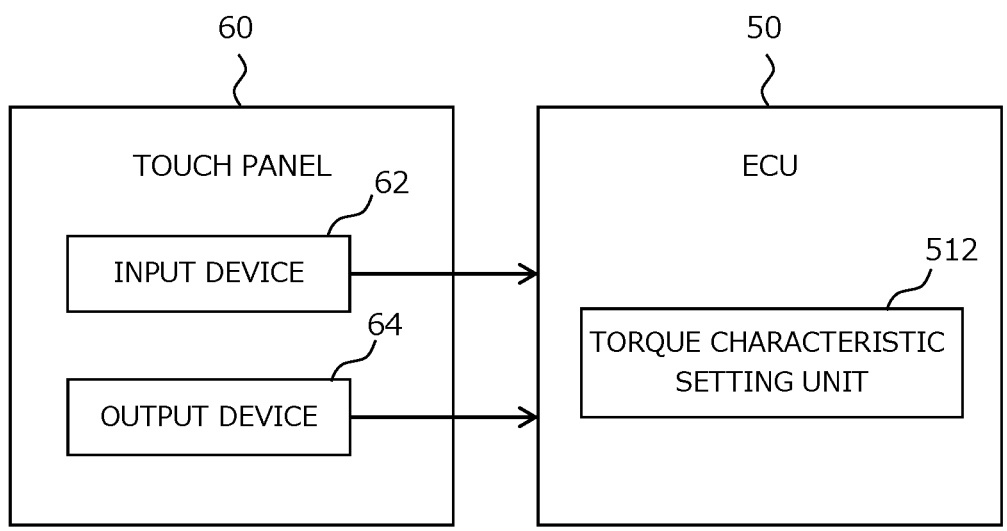
FIG. 8 is a block diagram showing a configuration and functions relating to a torque characteristic setting process.

The torque characteristics corresponding to the plurality of modes may be configured to be arbitrarily set by the driver. In the following description, the process of setting the torque characteristic by the driver is referred to as "torque characteristic setting process", the pattern of the torque characteristic to be set is referred to as "user preset pattern". FIG. 8 is a block diagram showing a configuration and functions relating to the torque characteristic setting process. As shown in FIG. 8, the user preset pattern can be set using, for example, a touch panel 60. The touch panel 60 includes an input device 62 for receiving a touch operation on the display as input information, and an output device 64 for displaying output information on the display. The ECU 50 is provided with a torque characteristic setting unit 512 as a functional block for executing the torque characteristic setting process. The torque characteristic setting unit 512 sets a user preset pattern based on input information input by the driver from the input device 62, and outputs the result to the output device 64.

Figure 9:
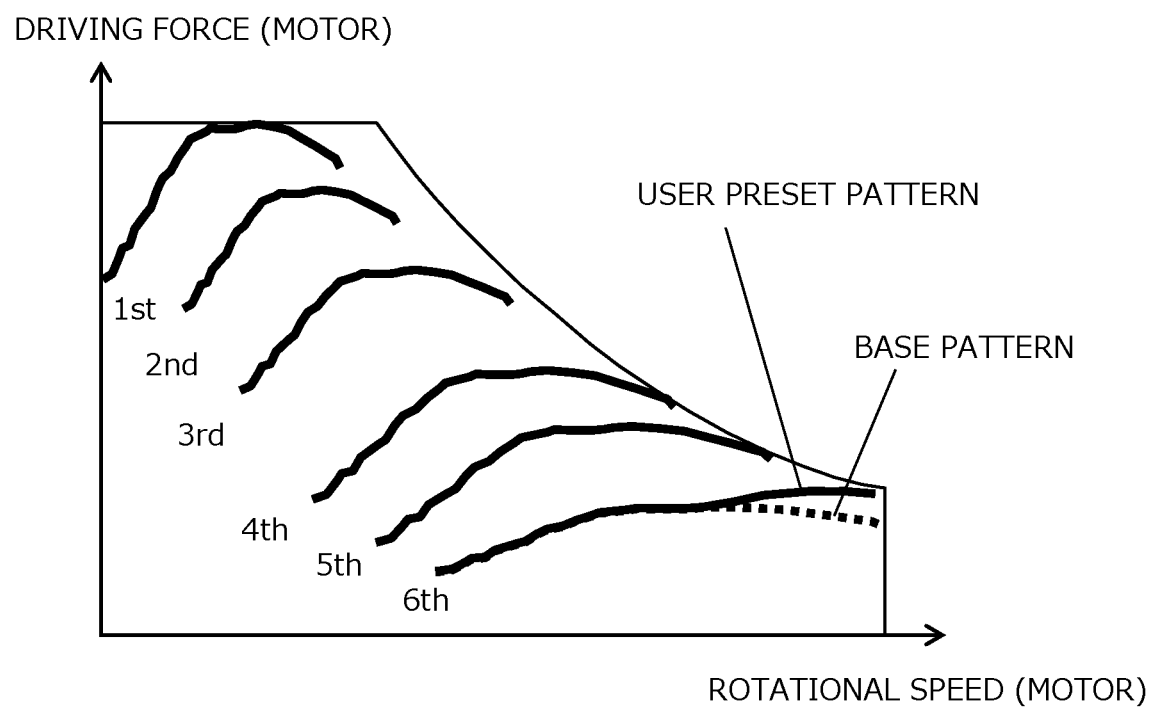
FIG. 9 is a diagram showing an example of a torque characteristic setting process using a touch panel.

FIG. 9 is a diagram showing an example of a torque characteristic setting process using a touch panel. In the torque characteristic setting process, the torque characteristic setting unit 512 displays a base pattern of the torque characteristic curve as shown in FIG. 9 on the output device 64 of the touch panel 60. The base pattern may be selected by the driver from among the stored preset patterns, or the torque characteristic setting unit 512 may display an arbitrary base pattern.

When the driver performs an operation such as touch-and-drag on the torque curve of the base pattern displayed on the touch panel 60, the information is input to the torque characteristic setting unit 512 as input information. The torque characteristic setting unit 512 deforms the torque curve in the direction dragged by the driver based on the input information. The torque characteristic setting unit 512 displays the torque curve after modification on the output device 64. FIG. 9 illustrates a case in which the driver changes the high rotation range of the 6th gear in the direction in which the driving force of the electric motor increases. According to such a torque characteristic setting process, the driver can set any user preset pattern to suit the preference.

In the above-described modification, an example in which the driver deforms the base pattern to an arbitrary pattern has been described, but a configuration in which the driver sets the pattern from zero using the input device 62 of the touch panel 60 may be used. Further, the input device 62 is not limited to the touch panel 60, it may be configured to use other input means such as input by a button or audio input.

4-5. Fifth Modification Example

An engine sound may be added to further enhance the feeling of driving an engine-mounted MT vehicle. Such a configuration, for example, the ECU 50 generates an engine sound corresponding to the virtual engine speed Ne, may be configured to output from a speaker. The engine sound may be configured to allow the driver to select a preferred engine sound, for example, from among several types depending on the engine type. In this case, the ECU 50 may generate an engine sound that simulates the sound of the selected engine type, based on the engine type selected by the driver (e.g., V8 type) and the virtual engine speed Ne. According to such a configuration, the driver can be used in a variety of ways, such as enjoying the V8 sound while driving the electric vehicle 10. Further, since the engine sound is generated according to the virtual engine speed Ne, it is possible to reproduce the engine sound of the situation such as revving or half-clutch in the MT vehicle.

4-6. Sixth Modification Example

The electric vehicle 10 of the present embodiment may be configured as a two-wheeled MT vehicle (motorcycle) not limited to four-wheeled MT vehicle (automobile). A typical motorcycle (MT vehicle) has a clutch lever operated by hand and a shift pedal operated by foot. Therefore, in the motorcycle as the electric vehicle 10, the shift pedal can be configured to have the function of the shift device in place of the shift lever 26 of the automobile, and the clutch lever can be configured to have the function of the clutch device in place of the clutch pedal 28 of the automobile. This make it possible to simulate the manual gear change operation of the MT vehicle in an electric motorcycle.

5. Others

The electric vehicle of the present disclosure may be configured as follows.

An electric vehicle that includes an electric motor for transmitting torque to a wheel and does not include an engine and a transmission connected to the engine and a clutch mechanism connected to the engine, the electric vehicle comprising:

a shift device operated by driver and configured to simulate an operation of the transmission;

a clutch device operated by the driver when the shift device is operated and configured to simulate an operation of the clutch mechanism; and a torque controller configured to control torque of the electric motor, wherein the shift device is configured to select a mode of any one of a plurality of modes in which torque characteristics of the electric motor differ in stages with respect to a rotational speed of the electric motor and output a signal including the selected mode to the torque controller, wherein the clutch device is configured to output a signal including an operation amount of the clutch device to the torque controller, wherein the torque controller is configured to control torque of the electric motor based on the signal including an operation amount of the clutch device and the signal including the mode selected by the shift device.

What is claimed is:

1. An electric vehicle that does not include an engine, a transmission connected to the engine and a clutch mechanism connected to the engine, the electric vehicle comprising:
    an electric motor configured to transmit torque to a wheel;
    a shift lever configured to be operated by a driver and to simulate an operation of the transmission;
    a clutch pedal configured to be operated by the driver when the shift lever is operated and configured to simulate an operation of the clutch mechanism; and
    a torque controller configured to control torque of the electric motor, wherein
    the shift lever is configured to select a mode of any one of a plurality of modes in which torque characteristics of the electric motor differ in stages with respect to a rotational speed of the electric motor and output a signal including the mode that is selected to the torque controller,
    the clutch pedal is configured to output a signal including an operation amount of the clutch pedal to the torque controller,
    the torque controller is configured to control torque of the electric motor based on the signal including an operation amount of the clutch pedal and the signal including the mode that is selected by the shift lever,
    the torque controller has a plurality of preset patterns, each of which defines different torque characteristics of the plurality of modes, and
    the torque controller is configured to control torque of the electric motor according to the torque characteristics of a preset pattern selected from among the plurality of preset patterns.

2. The electric vehicle according to claim 1, wherein the torque controller is configured to change torque of the electric motor toward zero as the operation amount of the clutch pedal increases.

3. The electric vehicle according to claim 1, wherein the torque controller is configured to change torque of the electric motor toward a value corresponding to the mode selected as the operation amount of the clutch pedal decreases.

4. The electric vehicle according to claim 1, wherein the torque controller is configured to allow selection of a mode by the shift lever only when the operation amount of the clutch pedal is larger than a predetermined operation amount.

5. The electric vehicle according to claim 1, wherein the torque controller is configured to acquire a virtual engine speed that simulates an engine speed assuming that a traveling condition of the electric vehicle is realized by a driving force of an engine based on a driving state of the electric vehicle, and
    the torque controller is configured to add an engine sound based on the virtual engine speed.

6. The electric vehicle according claim 1, further comprising an input device for arbitrarily setting torque characteristics of the plurality of modes.

7. An electric vehicle that does not include an engine and a transmission connected to the engine and a clutch mechanism connected to the engine, the electric vehicle comprising:
    an electric motor configured to transmit torque to a wheel;
    a shift lever configured to be operated by a driver and configured to simulate an operation of the transmission;
    a clutch lever configured to be operated by the driver when the shift lever is operated and configured to simulate an operation of the clutch mechanism; and
    a torque controller configured to control torque of the electric motor, wherein
    the shift lever is configured to select a mode of any one of a plurality of modes in which torque characteristics of the electric motor differ in stages with respect to a rotational speed of the electric motor and output a signal including the mode that is selected to the torque controller,
    the clutch lever is configured to output a signal including an operation amount of the clutch lever to the torque controller,
    the torque controller is configured to control torque of the electric motor based on the signal including an operation amount of the clutch lever and the signal including the mode that is selected by the shift lever,
    the torque controller has a plurality of preset patterns, each of which defines different torque characteristics of the plurality of modes, and
    the torque controller is configured to control torque of the electric motor according to the torque characteristics of a preset pattern selected from among the plurality of preset patterns.

8. The electric vehicle according to claim 1, further comprising
    an input device configured to allow the driver to select among the plurality of preset patterns.

* * * * *